(12) United States Patent
Chen et al.

(10) Patent No.: US 8,158,765 B2
(45) Date of Patent: Apr. 17, 2012

(54) WATER-TREATMENT PARTICLE AND A METHOD OF MANUFACTURING THEREOF

(75) Inventors: Su-Chen Chen, Tu-chen (TW); Jui-Sheng Lee, Tu-chen (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 734 days.

(21) Appl. No.: 11/962,824

(22) Filed: Dec. 21, 2007

(65) Prior Publication Data
US 2008/0154026 A1 Jun. 26, 2008

(30) Foreign Application Priority Data
Dec. 22, 2006 (TW) .............................. 95148601 A

(51) Int. Cl.
*C08B 37/08* (2006.01)
(52) U.S. Cl. ........................................................ 536/20
(58) Field of Classification Search .................. None
See application file for complete search history.

(56) References Cited

U.S. PATENT DOCUMENTS 5,011,610 A * 4/1991 Martin et al. ................. 210/667
5,720,793 A * 2/1998 Kato et al. ......................... 71/16

OTHER PUBLICATIONS

Guibal et al. Langmuir 1995, 11, 591-598.*

* cited by examiner

*Primary Examiner* — Layla Bland
(74) *Attorney, Agent, or Firm* — Knobbe Martens Olson & Bear LLP

(57) ABSTRACT

A method of manufacturing water-treatment particles comprises respectively preparing a particle-fabricating solution that comprises chitinous composition and a forming solution first. Next, a complex solution is prepared by adding calcium sulfite into the particle-fabricating solution. Finally, the complex solution is pumped into the forming solution to form water-treatment particles. In addition, water-treatment particles manufactured by the method above are also disclosed in the specification.

1 Claim, 2 Drawing Sheets

WATER-TREATMENT PARTICLE AND A METHOD OF MANUFACTURING THEREOF

CROSS-REFERENCE TO RELATED APPLICATIONS

This application claims priority to Taiwan Application Serial Number 95148601, filed Dec. 22, 2006, which is herein incorporated by reference.

BACKGROUND OF THE INVENTION

1. Field of the Invention

The present invention relates to a water filtering material. More particularly, the present invention relates to a water-treatment particle to remove chlorine from water.

2. Description of the Related Art

During the process of purifying water, some chlorine is added to water to inhibit the growth of microorganisms so that the viable count of bacteria can be controlled within a standard scale. However, chlorine remaining in water will cause skin lesions after long-term contact with chlorine. Therefore, various types of chlorine-removing materials have been developed.

Nevertheless, common chlorine-removing materials in the market neither function well to filter chlorine, nor remove chlorine efficiently while the flow amount of water is large. Furthermore, as the temperature increases, the efficiency of removing chlorine of these materials decreases and can not maintain ideal chlorine-removing efficiency. This limits the application of the chlorine-removing materials. Besides, after being used for a long time, these conventional chlorine-removing materials cause the growth of bacteria which might contaminate water.

For the forgoing reasons, a new material filtering water is needed which not only removes chlorine efficiently but also can inhibit the growth of bacteria after being used for a long time.

SUMMARY OF THE INVENTION

The present invention is directed to provide water-treatment particles with better chlorine removing efficiency.

It is therefore an objective of the present invention to provide a method of manufacturing water-treatment particles. First, a particle-fabricating solution comprising chitinous composition and a forming solution are prepared respectively. Next, calcium sulfite is added to the particle-fabricating solution to form a complex solution. Finally, the complex solution is pumped into a forming solution to form water-treatment particles.

In accordance with the foregoing and other objectives of the present invention, the step of preparing the particle-fabricating solution comprises adding chitinous composition to a acid solution. The chitinous composition is selected from a group consisting of chitin, chitosan, chitin derivatives, chitosan derivatives (e.g. phosphorylated chitin or carboxy-methyl chitin (CM Chitin)), and a combination thereof. The acid solution is an organic acid solution or an inorganic acid solution, such as hydrochloric acid, phosphoric acid, acetic acid solution, formic acid solution, lactic acid solution, or citric acid solution. The forming solution is a base solution or an anion polyelectrolyte solution wherein the base solution is sodium hydroxide solution, potassium hydroxide solution, or barium hydroxide solution. The anion polyelectrolyte solution is tripolyphosphate salt solution, oxidized cellulose solution, or sodium alginate solution.

It is another objective of the present invention to provide a water-treatment particle which comprises a calcium sulfite and a chitinous composition. The chitinous composition is selected from a group consisting of chitin, chitosan, chitin derivatives, chitosan derivatives and a combination thereof, and mixed with calcium sulfite uniformly so that a particle-shape is presented.

Compared with conventional filtering material, the chlorine removing efficiency of the water-treatment material above are not affected by temperature. Furthermore, after being used for a long time, these particles still have better antiseptic effect which inhibit the growth of bacteria.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Figure 1:
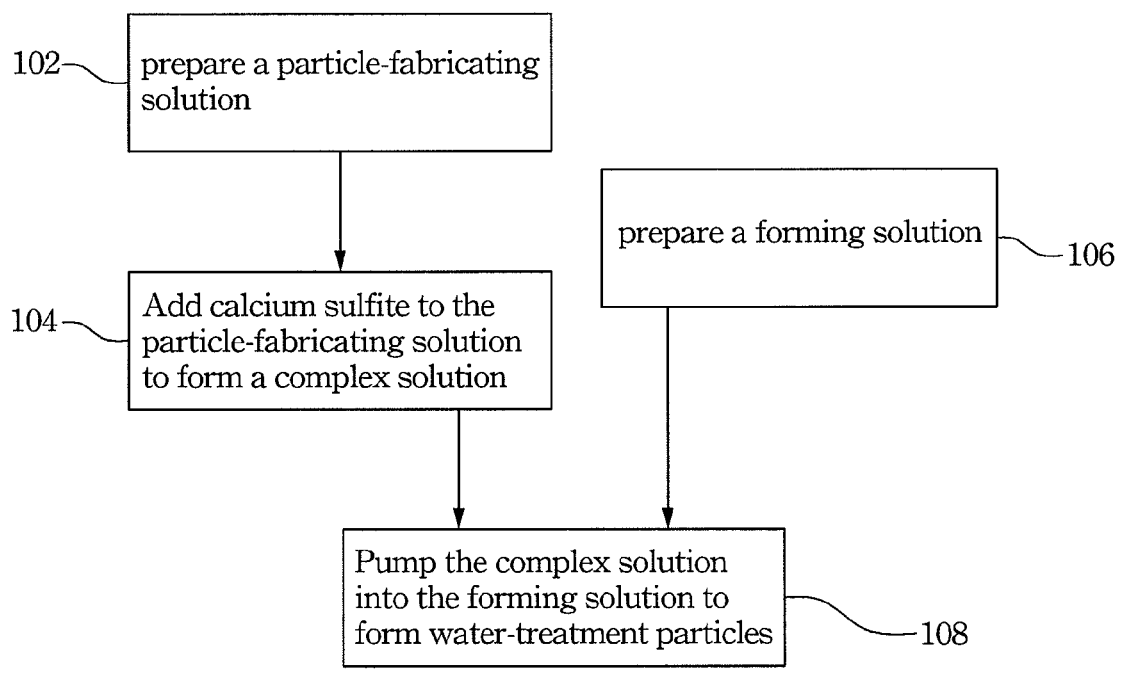
FIG. 1 is a flow chart of manufacturing water-treatment particles according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, it illustrates a process of manufacturing water-treatment particles according to one embodiment of the present invention. First, a chitinous composition is added to a acid solution to prepare the particle-fabricating solution (step 102). In the embodiment of the present invention, the chitinous composition is selected from a group consisting of chitin, chitosan, chitin derivatives, chitosan derivatives (e.g. phosphorylated chitin or carboxy-methyl chitin (CM Chitin)), and a combination thereof. The weight percentage concentration of the chitinous composition in the particle-fabricating solution is 1-30%. The weight percentage concentration of the acid solution is 1-10%, which is either organic acid solution or an inorganic acid solution. The inorganic acid solution is hydrochloric acid or phosphoric acid, and the organic acid solution is acetic acid solution, formic acid solution, lactic acid solution, or citric acid solution.

Next, calcium sulfite is added to the particle-fabricating solution to form a complex solution (step 104) wherein the mixing weight ratio between the calcium sulfite and the particle-fabricating solution is 0.1-10.

After that, a forming solution is prepared (step 106). The forming solution is a base solution or an anion polyelectrolyte solution and the weight percentage concentration of the forming solution is 1-10%. The base solution is sodium hydroxide solution, potassium hydroxide solution, or barium hydroxide solution. The anion polyelectrolyte solution is tripolyphosphate salt solution, oxidized cellulose solution, or sodium alginate solution. Finally, the complex solution is pumped into a forming solution to form water-treatment particles (step 108).

The water-treatment particles manufactured by the process above comprises calcium sulfite and chitinous composition wherein the chitinous composition is chitin, chitosan, chitin derivatives, or other chitosan derivatives. In addition, calcium sulfite and the chitinous composition are mixed uniformly so that a particle-shape is presented. The weight ratio between the calcium sulfite and the chitinous composition is 0.1-10.

During the process of filtering water, chlorine in water will be absorbed by the chitinous composition of the water-treatment particles. Meanwhile, chloride ions will react with calcium to generate calcium chloride and sulfite ions so that chlorine remaining in water can be removed. The preparation process is presented more detail in the exemplified embodiment as follows.

(I) The Preparation of Water-Treatment Particles

Figure 2:
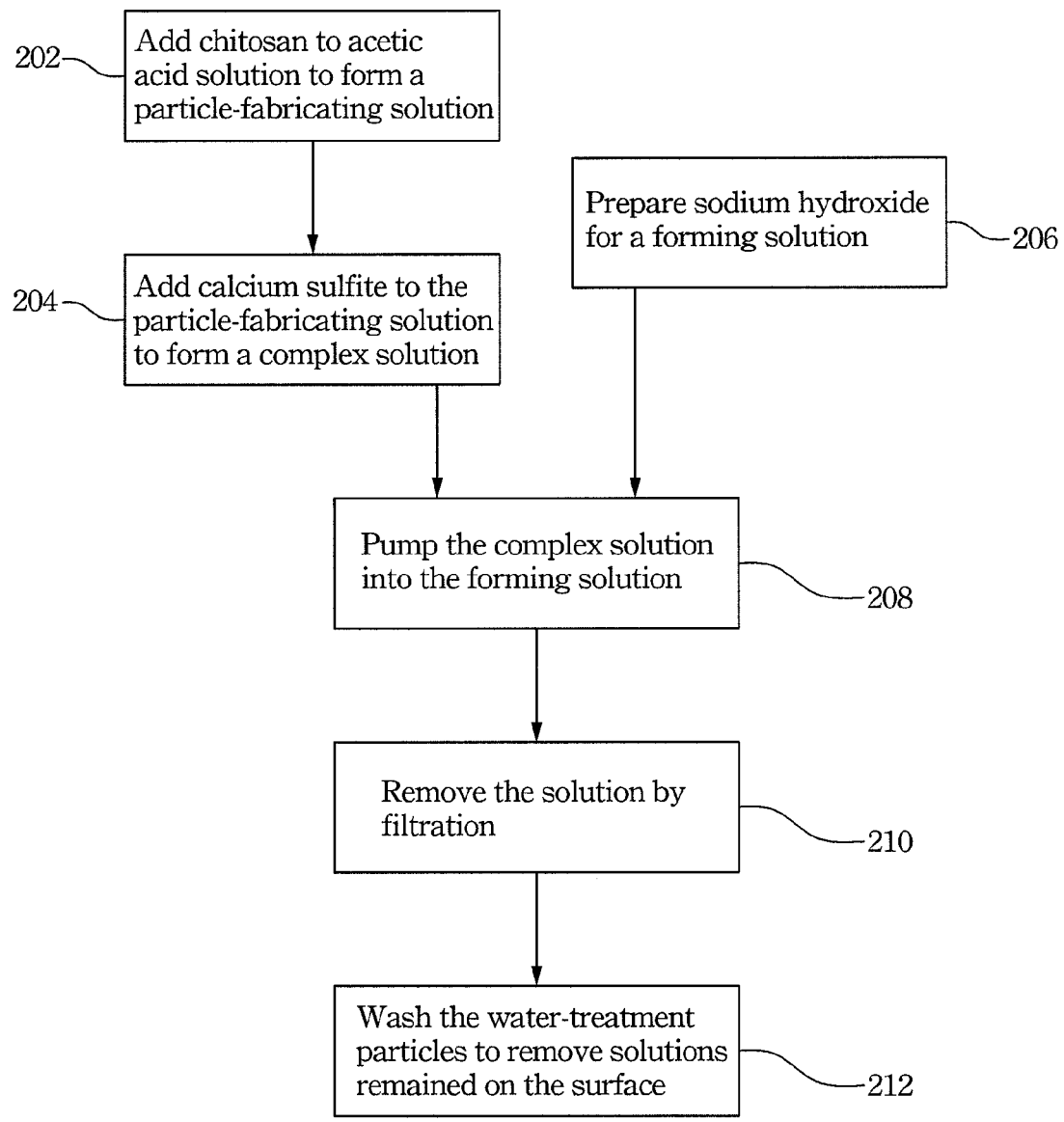
FIG. 2 is a flow chart of manufacturing water-treatment particles according to one embodiment of this invention.

Referring to FIG. 2, it illustrates a flow chart of how water-treatment particles are manufactured according to one embodiment of the present invention. First, 5 g of chitosan was added to 100 ml of 2 wt % acetic acid to form a particle-fabricating solution (step 202). Next, 5 g of calcium sulfite was added to the particle-fabricating solution above to form a complex solution (step 204). On the side, 100 ml of 5% wt of sodium hydroxide was prepared as a forming solution (step 206). After that, the complex solution was pumped into the forming solution by a pump (step 208). At this step, the complex solution was solidified quickly and turned into water-treatment particles comprising chitosan and calcium sulfite, when the complex solution contacted with the sodium hydroxide solution. Finally, the solution was removed by filtering so that water-treatment particles were obtained (step 210), and these water-treatment particles were washed by water to remove solutions remaining on the surface of the particles (step 212).

(II). Chlorine-Removing Test at 25° C.

To examine whether the water-treatment particles manufactured could provide good chlorine-removing efficiency at either room temperature or high temperature, these particles were tested at 25° C. and 40° C., respectively and also compared with other filtering materials.

First, several test samples were respectively flushed by 4 L, 20 L, 30 L, 60 L, 120 L, and 240 L of tap-water at 25° C. with the flush speed 2 L/min respectively. Then, residual chlorine in water was tested by residual chlorine test strips. The results were shown in the following Table I.

TABLE I result of chlorine-removed test at 25° C.

| | Chlorine Removed (ppm) | | | |
|---|---|---|---|---|
| Volume of Water (L) | Water-treatment Particles | Chitosan Powder | Chitosan Fibers | Carbon |
| 4 | 3.6 | 1.3 | 3.4 | 3.0 |
| 20 | 13.2 | 6.0 | 11.0 | 10.0 |
| 30 | 17.7 | 8.7 | 15.8 | 13.3 |
| 60 | 30.9 | 16.1 | 29.5 | 13.8 |
| 120 | 56.7 | 27.0 | 39.7 | 23.4 |
| 240 | 107.1 | 43.8 | 55.3 | 35.4 |

After filtering different volumes of water, the amount of chlorine removed by water-treatment particles, chitosan powders, chitosan fibers, and carbon were listed in Table I. According to Table I, no mater the volume of water flushed, water-treatment particles obviously removed more chlorine compared with other filtering materials. Especially, as the volume of water filtered increased, the chlorine removing efficiency of the water-treatment particles became more obvious. The amount of chlorine removed even reached 107.1 ppm while filtering 240 L of water.

(III) Chlorine-Removing Test at 40° C.

According to the test results above, it shows that the water-treatment particles did have great ability to remove chlorine in water. However, to examine whether the water-treatment particles still maintain the same efficiency at high temperature, they were test at 40° C., and also compared with other filtering materials. The results were listed in the Table II.

TABLE II result of chlorine-removed test at 40° C.

| | Chlorine Removed (ppm) | | |
|---|---|---|---|
| Volume of Water (L) | Water-Treatment Particles | Chitosan Powder | Carbon |
| 4 | 3.6 | 1.1 | 0.8 |
| 30 | 19.6 | 3.2 | 2.8 |

After filtering either 4 L or 30 L of water respectively, the amount of chlorine removed by water-treatment particles, chitosan powders, and carbon were listed in Table II. According to Table II, even though the temperature was increased, the water-treatment particles still have better ability to remove more chlorine compared with other filtering materials, while filtering the same amount of water. The amount of chlorine removed even reached 19.6 ppm while filtering 30 L of water. Furthermore, referring both Table I and Table II, it is noticed that as the temperature increased to 40° C., the chlorine removing efficiency of chitosan powders and carbon at 40° C. was apparently less than that of 25° C., when filtering the same amount of water (e.g. 30 L). However, there is no big difference for the chlorine removing efficiency of the water-treatment particles, no mater at 25° C. or 40° C.

(III). Antiseptic Effect Test of Water-Treatment Particles

Since general water filtering materials have to be soaked in water while being used, it always results in the growth of bacteria and water contamination. Therefore, the following test was to examine if the water-treatment particles could provide better antiseptic effect. Three portions of 0.1 ml water which had been filtered by the water-treatment particles, chitosan powders, and carbon respectively were cultured in agar media for one day, and then the viable count of bacteria in the media were observed to examine the quality of water. The results were shown in Table III.

TABLE III antiseptic effect test result of water-treatment particles

| Filtering Material | Water-treatment Particles | Chitosan Powder | Carbon |
|---|---|---|---|
| viable count of bacteria (cfu/ml) | <10 | ~1000 | >2000 |

According to Table III, for water filtered by the water-treatment particles, its viable count of bacteria was less than 10 cfu/ml. However, for water filtered by either chitosan powder or carbon, the viable count of these two samples increased to 1000 cfu/ml, or even to greater than 2000 cfu/ml. The antiseptic effect apparently decreased a lot, compared with that of the water-treatment particles. In view of above, the water-treatment particles provides better anti-septic effect which inhibits the growth of bacteria and assures the quality of water.

(IV) Antiseptic Effect Test of Water-Treatment Particles after Used for a Long Time The following test was to examine whether the water-treatment particles still maintain good antiseptic effect after being used for a long time. First, 0.5 g of water-treatment particles and carbon were soaked in water for a month respectively. Then, water-treatment particles and carbon were transferred to media containing *Staphylococcus aureus* (bacterial count: $2.3 \times 10^5$) and cultured for 10 hours. Finally, the water-treatment particles and carbon were observed. In this time, water which was laid aside for month without any filtering material therein was used as the control. The results were shown in Table IV.

TABLE IV antiseptic effect test result of water-treatment particles after used for a long time

| Filtering Material | Control | Water-treatment Particles | Carbon |
|---|---|---|---|
| Viable count of bacteria (cfu/ml) | $2.6 \times 10^6$ | $1.8 \times 10^6$ | $2.2 \times 10^6$ |

According to Table IV, it is noticed that the bacteria grew incredible in the control that was laid aside for a month, and the viable count of bacteria increased to $2.6 \times 10^6$ cfu/ml after cultured. Similarly, the viable count of bacteria in the carbon sample was increased to $2.2 \times 10^6$ cfu/ml. This indicates that the antiseptic effect of carbon soaked in water for a month decreased which can not inhibit the growth of bacteria efficiently. However, after being soaked in water for a long time, water-treatment particles still maintain better antiseptic effect, and the viable count of bacteria was only $1.8 \times 10^6$ cfu/ml.

(V) Long-Term Efficiency Test of Water-Treatment Particles

The term, "long-term efficiency" herein indicates that the chlorine removing efficiency after the filtering material has been used for several days or has filtered a great amount of water. Hence, the following test was to test the long-term efficiency of water-treatment particles. In the test, the water-treatment particles were flushed by 4 L or 120 L of water each day for successive 9 days, and the amount of chlorine removed was recorded each day. The results were shown in Table V.

TABLE V long-term efficiency test result of water-treatment particles

| Volume of Water (L) | Chlorine Removed (ppm) | | | | | |
|---|---|---|---|---|---|---|
| | Day 1 | Day 2 | Day 3 | Day 6 | Day 8 | Day 9 |
| 4 | 3.6 | 3.7 | 3.6 | 3.8 | 3.7 | 3.7 |
| 120 | 56.7 | 67.2 | 60.5 | 76.3 | 62.4 | 66.3 |

Since there was not much difference between the results from day 1 to day 9 days, only the results of day 1, day 2, day 3, day 6, day 8, and day 9 were listed in Table V. According to Table V, the chlorine removing efficiency of the water-treatment particles was always maintained at certain level whether they were flushed by 4 L or 120 L of water each day for 9 days (i.e. the total volume of water filtered were 36 L and 1080 L respectively). Even though the water-treatment particles were used for several days continuously or flushed by a great amount of water, and the long-term efficiency was not reduced. Hence, the water-treatment particles manufactured by the embodiment of the present invention do have great long-term efficiency.

In view of above, the water-treatment particles manufactured by the embodiment above not only have better long-term efficiency, but also have better chlorine removing efficiency, no matter at room temperature or at high temperature. In addition, after being used for a long-time, these particles can still keep antiseptic effect so that they are suitable for long-term kept in water.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A water-treatment particle, comprising:
   a calcium sulfite; and
   a chitinous composition comprising chitosan,
wherein the calcium sulfite and the chitinous composition are uniformly mixed so that a particle-shape presents, wherein the weight ratio of the calcium sulfite and the chitosan is about 1:1, and wherein the particle has a greater antiseptic effect than the sum of the individual antiseptic effects of the calcium sulfite and the chitosan.

* * * * *